2,814,567

MAGNESIA REFRACTORIES

Edward P. Pearson and Samuel Rusoff, Tiffin, Ohio, assignors to Basic, Incorporated, a corporation of Ohio No Drawing. Application October 14, 1953,
Serial No. 386,126

7 Claims. (Cl. 106—62)

Refractories based on dead-burned granular magnesia are used in various applications; among which is tamping or ramming, wherein the mass is compacted into position by pneumatic tampers or large hammers. Properties are required here which are not inherently related. The material should pack together without excessive resistance, and as the tamper rises, the material should not sponge or bulge, and establishment of a compact body should not require excessive time and effort. In the present invention, a materially improved result is now possible, in that a refractory which is well suited for tamping may be had, providing effective bonding with remarkably little application of force and time. Other objects and advantages will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In general, the invention involves a refractory of hard-burned hydration-resistant magnesia and of reactive inorganic bonding agent, preferably alkali metal phospho-aluminate, and trisodium phosphate, and a cellulose carboxyether, as carboxymethylcellulose or higher homolog or the sodium salts thereof. Preferably also, a small amount of sodium carbonate is included. The relative amounts of the ingredients may vary somewhat, and the bonding magnesia component of finely ground material may range from 20–40 parts by weight.

The greater proportion of the refractory composition is relatively coarse granular magnesia clinker, and this may be in amount 50–70 parts by weight.

The magnesia calcined at high temperature to a hydration-resistant state, insofar as it is a bonding component, is very finely divided. At least about 65% of such bonding component should pass a 200 mesh screen (U. S. Standard). The other components of the bond portion are in minor amounts, the alkali metal phospho-aluminate being 0.5–10 parts, trisodium phosphate 0.25–1.25 parts, sodium carboxymethylcellulose 0.1–0.3 parts, and sodium carbonate 0.5–2.50 parts, all by weight. The sodium phospho-aluminate of commerce consists essentially of: $Na_2O$ 44.5 percent, $Al_2O_3$ 43.5 percent, and $P_2O_5$ 8.5 percent. It is a double salt of sodium aluminate and sodium orthophosphate, and is used in essentially anhydrous state. It is best ground with the other ingredients of the refractory to give a fine fraction which is then blended with the coarser particles which are to make up the refractory. The carboxymethylcellulose may advantageously be in the form of sodium carboxymethylcellulose, and as a dry powder is conveniently milled with the other ingredients of the bond. The bulk of the refractory or the greater proportion is dead-burned magnesia clinker ground to a relatively coarse mesh, as for instance to −4+20 mesh (U. S. Standard), and this is bonded by the reaction product of the finely ground magnesia with the other reactants. It is found that the use of a material of this character results in outstanding workability, and any spongy action of the material during tamping is absent. This is a valuable characteristic in that it reduces the time and labor needed to compact the mass to its most dense form.

Examples illustrative of the invention are:

I. The following materials were mixed in the dry state:

| | Parts by weight |
|---|---|
| Dead-burned magnesia clinker, −4+20 mesh | 60.00 |
| Dead-burned magnesia clinker, 65% through 200 mesh | 37.30 |
| Sodium phospho-aluminate | 1.00 |
| Sodium carbonate | 1.00 |
| Trisodium phosphate | 0.50 |
| Sodium carboxymethylcellulose | 0.20 |

By the phrase "65% through 200 mesh" is meant that the indicated magnesia component is ground until sufficiently fine to pass at least 65% thereof through a 200 mesh screen, U. S. Standard.

This dry mixture was tempered by the addition of 6 parts of water, and test pieces were made from a portion by molding in a Dietert machine with 20 strokes into 2 in. diameter by 2 in. high cylinders. These test piece cylinders were dried for 24 hours at 265° F., and were then crushed at various test temperatures to ascertain their compressive strength. The results of these tests were as follows:

| | p. s. i. |
|---|---|
| Room temperature | 1725 |
| 1000° F.[1] | 774 |
| 1500° F.[1] | 240 |
| 2000° F.[1] | 432 |

[1] These specimens were held at the indicated temperature for at least one hour prior to the crushing.

II. A mixture was prepared of hard-burned, hydration-resistant magnesian material 60 parts coarser than 20 mesh, 33.75 parts ground to 65% finer than 200 mesh, sodium phospho-aluminate (through 30 mesh) 2.5 parts, trisodium phosphate (through 30 mesh) 1.25 parts, sodium carbonate (through 30 mesh) 2.5 parts, and sodium carboxymethylcellulose 0.10, all by weight. The dry materials were mixed and then tempered with 5.8% of water. Test pieces 2 inches in diameter by 2 inches high were molded by ramming in a sand ramming test machine by 20 strokes. The formed pieces were dried at 250° F. for 24 hours, cooled to room temperature and finally tested for compressive strength at various temperatures. All test pieces tested above room temperature were held at the test temperature for one hour prior to crushing. The results for the average of two individual test pieces at each temperature were as follows:

| Test temperature: | Compressive strength, p. s. i. |
|---|---|
| 70° F. | In excess of 2000 |
| 1000° F. | 1375 |
| 1500° F. | 204 |
| 2000° F. | 609 |

III. A mixture was prepared of hard-burned, hydration-resistant magnesian material 60 parts coarser than 20 mesh, 37.5 parts ground to 65% minus 200 mesh, sodium phospho-aluminate (through 30 mesh) 1.0 part, trisodium phosphate (through 30 mesh) 0.5 part, sodium carbonate (through 30 mesh) 1.0 part, and sodium carboxymethylcellulose 0.10, all by weight. The materials were mixed and tempered with 5.8% of water. Two-inch diameter test pieces were made as shown in Example I, and, after being dried at 250° F. for 24 hours, were tested for compressive strengths at various temperatures. All test pieces tested above room temperature were held at the test temperature for one hour prior to crushing. The results for the average of two individual test pieces at each temperature were as follows:

| Test temperature: | Compressive strength, p. s. i. |
|---|---|
| 70° F | In excess of 2000 |
| 1000° F | 1425 |
| 1500° F | 219 |
| 2000° F | 250 |

Other modes of applying the principle of the invention may be employed, change being made as regards the details described, provided the features stated in any of the following claims or the equivalent of such be employed.

We therefore particularly point out and distinctly claim as our invention:

1. A refractory composition for use in furnace linings and the like consisting essentially of the following intermixed ingredients in approximately the indicated parts by weight, viz.:

| | |
|---|---|
| Dead-burned magnesia clinker, −4+20 mesh | 60.00 |
| Dead-burned magnesia clinker, 65% through 200 mesh | 33.75–37.50 |
| Sodium phospho-aluminate | 1.00–2.5 |
| Sodium carbonate | 1.00–2.5 |
| Trisodium phosphate | 0.50–1.25 |
| Sodium carboxymethylcellulose | 0.10–0.20 |

2. A refractory composition for use in furnace linings and the like consisting essentially of the following intermixed ingredients in approximately the indicated parts by weight, viz.:

| | |
|---|---|
| Dead-burned magnesia clinker | 60.00 |
| Finely divided magnesia clinker, 65% through 200 mesh | 33.75–37.50 |
| Sodium phospho-aluminate | 1.00–2.5 |
| Trisodium phosphate | 0.50–1.25 |
| Sodium carboxymethylcellulose | 0.10–0.20 |

3. A refractory composition consisting essentially of dead-burned magnesia, a portion of said magnesia having sufficiently small particle size to pass at least 65% of said portion through a 200 mesh screen, and about 1 to 3 percent of sodium phospho-aluminate, and about 0.1 to 0.3 percent of a cellulose carboxyether selected from the group consisting of carboxymethylcellulose and sodium salts thereof intermixed with said magnesia portion to bind together the remaining magnesia.

4. A refractory composition for use in furnace linings and the like consisting essentially of dead-burned magnesia, some of said magnesia having a particle size coarser than 20 mesh, a lesser amount of said magnesia having a sufficiently small particle size to pass at least 65% of said lesser amount through a 200 meh screen, and a binder for the coarser than 20 mesh magnesia consisting essentially of about 1 to 3 percent of sodium phospho-aluminate and about 0.1 to 0.3 percent of a cellulose carboxyether selected from the group consisting of carboxymethylcellulose and sodium salts thereof combined with said lesser amount of magnesia.

5. A refractory composition for use in furnace linings and the like consisting essentially of dead-burned magnesia, about 20% to 40% of said magnesia serving as a binder ingredient and being sufficiently ground to pass at least 65% thereof through a 200 mesh, and about 1 to 3 percent of sodium phospho-aluminate, about 0.1 to 0.3 percent of a cellulose carboxyether selected from the group consisting of carboxymethylcellulose and sodium salts thereof, and about 0.25 to 1.25 percent of trisodium phosphate reacted with the magnesia serving as a binder ingredient to bind the remaining magnesia together and form said refractory composition.

6. The method of improving the workability of refractory compositions consisting essentially of dead-burned magnesia having a portion thereof sufficiently ground to pass 65% of said portion through a 200 mesh screen and sodium phospho-aluminate forming a binder with said portion of the magnesia, said method consisting in adding to such composition about 0.1 to 0.3 percent of a cellulose carboxyether selected from the group consisting of carboxymethylcellulose and sodium salts thereof.

7. The method of improving the workability of refractory compositions consisting essentially of dead-burned magnesia having a portion thereof sufficiently ground to pass 65% of said portion through a 200 mesh screen and 1 to 3 percent of sodium phospho-aluminate forming a binder with said portion of the magnesia, said method consisting in intermixing with such compositions approximately 0.1 to 0.3 percent of a cellulose carboxyether selected from the group consisting of carboxymethylcellulose and sodium salts thereof.

No references cited.